United States Patent [19]

Reiff et al.

[11] Patent Number: 5,508,370

[45] Date of Patent: Apr. 16, 1996

[54] WATER-DISPERSIBLE BLOCKED ISOCYANATES, METHOD OF MANUFACTURE, AND USE THEREOF

[75] Inventors: Helmut Reiff; Karl-Heinz Passon; Hans-Albert Ehlert; Peter Nussbaum, all of Leverkusen, Germany

[73] Assignee: Bayer Aktiengesellschaft, Leverkusen, Germany

[21] Appl. No.: 135,642

[22] Filed: Oct. 12, 1993

Related U.S. Application Data

[63] Continuation-in-part of Ser. No. 960,604, Oct. 13, 1992, abandoned.

[30] Foreign Application Priority Data

Oct. 17, 1991 [DE] Germany .................. 41 34 284.4

[51] Int. Cl.$^6$ .................. C08G 18/08; C08G 18/80
[52] U.S. Cl. .................. 528/45; 524/507; 524/591; 528/70; 528/59; 252/182.2; 252/182.21; 252/188.22; 8/115.6; 8/192; 525/124
[58] Field of Search .................. 524/507, 591; 528/45, 70; 252/182.2, 182.21, 182.22; 8/115.6, 192

[56] References Cited

U.S. PATENT DOCUMENTS

| | | | |
|---|---|---|---|
| 3,329,661 | 7/1967 | Smith et al. | 523/414 |
| 3,356,628 | 12/1967 | Smith et al. | 524/544 |
| 3,636,085 | 1/1972 | Kleiner | 560/196 |
| 3,657,320 | 4/1972 | Anello et al. | 560/26 |
| 3,681,426 | 8/1972 | Hahn et al. | 560/25 |
| 3,736,300 | 5/1973 | Kleiner | 525/200 |
| 3,752,783 | 8/1973 | Iwantani | 524/195 |
| 3,759,874 | 9/1973 | Gresham | 528/45 |
| 3,879,440 | 4/1975 | Anello et al. | 560/13 |
| 3,993,833 | 11/1976 | Esmay | 428/311 |
| 4,039,517 | 8/1977 | Hamamura et al. | 428/425 |
| 4,098,933 | 7/1978 | Burkhardt et al. | 427/379 |
| 4,123,423 | 10/1978 | Wenzel et al. | 528/71 |
| 4,264,484 | 4/1981 | Patel | 428/96 |
| 4,284,544 | 8/1981 | Wegner et al. | 528/45 |
| 4,296,244 | 10/1981 | Fukui et al. | 526/243 |
| 4,321,403 | 3/1982 | Oxenrider et al. | 560/87 |
| 4,340,749 | 7/1982 | Patel | 560/182 |
| 4,357,441 | 11/1982 | Hamamura et al. | 524/591 |
| 4,452,834 | 6/1984 | Nachtkamp et al. | 427/379 |
| 4,468,527 | 8/1984 | Patel | 564/96 |
| 4,670,100 | 6/1987 | Henning et al. | 162/135 |
| 4,781,844 | 11/1988 | Kortmann et al. | 252/8.6 |
| 4,834,764 | 5/1989 | Deiner et al. | 8/115.64 |
| 4,859,754 | 8/1989 | Maekawa et al. | 526/245 |
| 4,936,865 | 6/1990 | Welch et al. | 8/120 |
| 4,990,406 | 2/1991 | Kappler | 428/422 |

FOREIGN PATENT DOCUMENTS

| | | |
|---|---|---|
| 859241 | 2/1967 | Canada . |
| 1106960 | 5/1961 | Germany . |
| 1419505 | 1/1969 | Germany . |
| 3117071 | 3/1984 | Germany . |
| 999795 | 7/1965 | United Kingdom . |
| 1543084 | 3/1979 | United Kingdom . |

OTHER PUBLICATIONS

Textilveredelung 2 Jul. (1967), No. 7, 441 Jul., 1967, F. Reich.

Textilveredelung 13 Nov. (1978), No. 11, 454–457; Ind. Eng., F. Reich.

Chem. Prod. Res. Dev., vol. 21, No. 1 4–11 Jan., 1982, C. Tomasano.

*Primary Examiner*—James J. Seidleck
*Assistant Examiner*—R. F. Johnson
*Attorney, Agent, or Firm*—Joseph C. Gil; Richard E. L. Henderson

[57] ABSTRACT

The invention relates to a blocked polyisocyanate having an NCO functionality of from 2.2 to 4.5 and an average molecular weight of 800 to 25,000 and containing (1) blocked isocyanate groups corresponding to an NCO content of 5 to 20 wt. % calculated as free NCO, relative to unblocked polyisocyanate, (2) 1 to 75 meq of ionic groups per 100 g of blocked polyisocyanate, and (3) 3 to 40 wt. % of polyalkylene oxide units relative to the blocked polyisocyanate prepared by the reaction of (a) organic polyisocyanates, (b) NCO-reactive compounds containing ionic or potentially ionic groups, (c) polyalkylene ethers, (d) NCO-blocking agents, and (d) optionally, other NCO-reactive compounds different from components (b), (c) and (d), wherein said process is carried out by either (A) reacting components (a), (b), (c) and, optionally, (e) to form an unblocked polyisocyanate intermediate and then reacting the intermediate with NCO-blocking agent (d) other than an alkali metal bisulfite to form the blocked polyisocyanate, or (B) reacting components (a), (c) and, optionally, (e) with an alkali-metal bisulfite to form the blocked polyisocyanate.

6 Claims, No Drawings

WATER-DISPERSIBLE BLOCKED ISOCYANATES, METHOD OF MANUFACTURE, AND USE THEREOF

This application is a continuation-in-part application of parent application Ser. No. 960 604, filed Oct. 13, 1992 now abandoned.

BACKGROUND OF THE INVENTION

The invention relates to water-dispersible blocked polyisocyanates containing ionic groups and polyether groups, a method of manufacturing using a final blocking step, and use of the blocked polyisocyanates to produce textile aids, for example, for water-proofing and oil-proofing or for preparing highly upgraded textiles.

Blocked polyisocyanates containing incorporated polyalkylene oxide units and/or ionic groups are hydrophilic and therefore dispersible in water and can be processed starting from the aqueous phase. These blocked polyisocyanates are thermosetting, since the blocking agent is given off when the deblocking temperature is reached, yielding free isocyanate groups which can react with isocyanate-reactive compounds (that is, compounds containing active hydrogen atoms). These water-dispersible blocked polyisocyanates are suitable not only as lacquer binder components for coating metals, wood, paper, or surfaces of plastic articles, but also as components of aqueous textile finishing agents. Blocked polyisocyanates preferred for this purpose contain incorporated polyalkylene oxide units and ionic groups. Suitable starting components for introducing these hydrophilic groups comprise on the one hand polyether diols and on the other hand compounds that (1) contain groups capable of reacting with isocyanate groups and (2) contain ionic groups or groups convertible into ionic groups. Sulfonate diols, dihydroxycarboxylic acids, and diaminocarboxylic acids are examples of starting components for introducing "potentially" ionic groups.

In the known methods for manufacturing water-dispersible blocked polyisocyanates, polyether diols suitable as hydrophilic components have been incorporated during or after the blocking action, but the reaction with the compounds that provide the ionic groups (except for alkali-metal sulfites, which serve the double purpose of blocking agents and introducing ionic groups) has been brought about with partially blocked polyisocyanates; German Offenlegungsschriften 2,456,469 (believed to correspond to U.S. Pat. No. 4,098,933) and 2,853,937. Alkali-metal bisulfites occupy a special position as inorganic blocking agents. Although these compounds introduce ionic groups, in the past they have been viewed exclusively as isocyanate blocking agents because the ionic groups introduced into the polyisocyanate using alkali-metal bisulfites in the reaction between bisulfite-blocked isocyanate groups and isocyanate-reactive compound are not a component of the polyisocyanate addition products.

It has now unexpectedly been found that technically superior products are obtained, if, in the manufacture of blocked isocyanates containing incorporated polyalkylene oxide units and ionic groups, either a polyisocyanate containing polyalkylene oxide units and ionic groups is produced without using blocking agents, after which the remaining free isocyanate groups of this intermediate are blocked, or alkali-metal bisulfites are used as the blocking agent.

The average molecular weights referred to below are number average molecular weights.

SUMMARY OF THE INVENTION

The invention accordingly relates to a blocked polyisocyanate having an average molecular weight of 800 to 25,000 (preferably 1000 to 5000) and containing (1) blocked isocyanate groups corresponding to an NCO content of 5 to 20 wt. % (preferably 10 to 20 wt. %), calculated as free NCO, relative to unblocked polyisocyanate (that is, the polyisocyanate of the invention taken as having free NCO groups instead of blocked NCO groups), (2) 1 to 75 (preferably 2 to 25) milliequivalents (meq) of ionic groups per 100 g of blocked polyisocyanate, and (3) 3 to 40 wt. % of polyalkylene oxide units relative to the blocked polyisocyanate, wherein said blocked polyisocyanate is prepared by a process comprising reacting (a) organic polyisocyanates, (b) NCO-reactive compounds containing ionic or potentially ionic groups, (c) polyalkylene ethers, (d) NCO-blocking agents, and (d) optionally, other NCO-reactive compounds different from components (b), (c) and (d), wherein said process is carried out by either (A) reacting components (a), (b), (c) and, optionally, (e) to form an unblocked polyisocyanate containing incorporated polyalkylene oxide units and ionic groups and then reacting said unblocked polyisocyanate with NCO-blocking agent (d) (which blocks free NCO groups) other than an alkali metal bisulfite to form the blocked polyisocyanate, or (B) reacting components (a), (c) and, optionally, (e) with an alkali-metal bisulfite serving as both NCO-blocking agent (d) and NCO-reactive component (b) to form the blocked polyisocyanate.

The invention also relates to the method for preparing the blocked polyisocyanates.

DETAILED DESCRIPTION OF THE INVENTION

Preferred blocked polyisocyanates are based on unblocked polyisocyanates having an NCO functionality of from 2.2 to 4.5, particularly from 2.6 to 4.5. Said NCO functionality is either that of the unblocked products obtained by reaction of components (a), (b), (c) and, optionally, (d) as they exist prior to the blocking reaction in alternative (A) or that of unblocked products obtained if components (a), (c) and, optionally, (e) are reacted together—with the exclusion of the alkali metal bisulfite—according to alternative (B).

The foregoing data relating to the NCO functionality of the reaction products are based on values which can be calculated from the type and functionality of the starting components in accordance with the following equation:

$$f = \frac{\Sigma \text{val NCO} - \Sigma \text{val (OH + NH)}}{\Sigma \text{mol (NCO + OH + NH)} - \Sigma \text{val (OH + NH)}}$$

The organic polisocyanates (a) can be aliphatic, cycloaliphatic, araliphatic, aromatic, or heterocyclic polyisocyanates as described, for example, by W. Siefken in *Liebigs Annalen der Chemie*, 562, pages 75 to 136. The preferred polyisocyanates (a) are compounds having the formula Q(NCO)$_n$ with an average molecular weight below 800, where n is a number from 2 to 4, Q is an aliphatic C$_4$–C$_{12}$ hydrocarbon group, a cycloaliphatic C$_6$–C$_{15}$ hydrocarbon group, an araliphatic C$_7$–C$_{15}$ hydrocarbon group, or a heterocyclic C$_2$–C$_{12}$ group with 1 to 3 heteroatoms selected from oxygen, sulfur, and nitrogen. Examples of suitable polyisocyanates include (i) diisocyanates such as ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate or any mixtures of these isomers, 1-isocyanato-2-isocyanatomethylcyclopentane, 1-isocyanato-3,3,5-trimethyl-5-isocyanatomethylcyclohexane, 2,4- and 2,6-hexahydrotoluene diisocyanate or any mixtures of these isomers, hexahydro-1,3- and/or -1,4-phenylene diisocyanate, perhydro-2,4'- and/or 4,4'-diphenylmethane diisocyanate, 1,3- and 1,4-phenylene diisocyanate, 2,4 and 2,6-toluene diisocyanate or any mixtures of these isomers, diphenylmethane-2,4'- and/or -4,4'-diisocyanate, naphthalene-1,5-diisocyanate, polyisocyanates containing uretdione groups such as bis(6-isocyanatohexyl)uretdione or the uretdione-structural dimers of 1-isocyanato-3,3,5-trimethyl-5-isocyanatomethylcyclohexane and any mixtures of the aforementioned polyisocyanates; (ii) tri- and higher-functional polyisocyanates such as the isomers of the triisocyanatotriphenyl thiophosphate series and mixtures thereof; the isomers of the triisocyanatotriphenylmethane series (such as triphenylmethane-4,4',4"-triisocyanate) and mixtures thereof; or polyphenyl polymethylene polyisocyanates obtained by aniline/formaldehyde condensation and subsequent phosgenation; and (iii) compounds obtained by allophanatization, trimerization, biuretization, or urethanization from the polyisocyanates (i) and/or (ii) and containing at least three isocyanate groups per molecule. Examples of polyisocyanates produced by trimerization include the trimer of 1-isocyanato-3,3,5-trimethyl-5-isocyanatomethylcyclohexane obtained by isocyanate formation and the polyisocyanates containing isocyanurate groups obtainable by trimerization of hexamethylene diisocyanate, optionally mixed with 2,4-diisocyanatotoluene. Examples of polyisocyanates produced by biuretization include tris(isocyanatohexyl) biuret and mixtures and higher homologs thereof obtainable, for example, by the method disclosed in German Offenlegungsschrift 2,308,015. Examples of polyisocyanates prepared by urethanization include the reaction products of polyisocyanates (i) with at least trivalent (preferably tri- or tetravalent) low-molecular polyols in a proportion such that when all the NCO-reactive hydroxyl groups of the molecule react, at least 2.5 (preferably at least 3) free isocyanate groups are obtained on average per molecule of the resultant product. These products include, for example, the reaction products of 1-isocyanato- 3,3,5-trimethyl-5-isocyanatomethylcyclohexane, hexamethylene diisocyanate, and toluene diisocyanate (including isomer mixtures thereof) and diisocyanatodiphenylmethane (including isomer mixtures thereof) with excess quantities of C$_3$–C$_{10}$ polyols with three or four hydroxyl groups (such as trimethylol ethane or propane or pentaerythritol). These polyisocyanates (iii) containing urethane groups can be obtained by reacting the low-molecular polyol with a large excess of diisocyanate (i) and subsequent removal of the excess diisocyanate by distillation. Instead of the higher-functional polyisocyanates (iii) containing the urethane groups, use can be made of compounds in which the urethane groups have been partly or completely replaced by urea groups. Such compounds can be obtained by additional use of low-molecular polyamines during the reaction with the diisocyanates (i).

In general the starting components (b) for introducing ionic groups can be compounds which, per molecule, contain at least one NCO-reactive group and at least one cationic or anionic group (for example, an ammonium, phosphonium, sulfonium, carboxylate, sulfonate, phosphate, phosphonate, or phosphinate group). The components (b) for introducing potentially ionic groups can be compounds which, per molecule, contain at least one NCO-reactive group and at least one group capable of forming an ionic group. Examples of such potentially ionic groups include amino, phosphano, thio, carboxyl, sulfo, phosphonic acid, phosphoric acid, and phosphinic acid groups.

Preferred components (b) are, therefore, mainly the following:

1. Compounds containing basic amino groups neutralizable with aqueous acids or quaternizable tertiary amino groups, that is:

a) monovalent alcohols, more particularly alkoxylated aliphatic, cycloaliphatic, aromatic, or heterocyclic secondary amines, such as N,N-dimethylethanolamine, N,N-diethylethanolamine, or N,N-dibutylethanolamine, or 1-dimethylaminopropanol-(2), N-methyl-N-(β-hydroxyethyl)-aniline, N-methyl-N-β-hydroxypropylaniline, N-ethyl-N-β-hydroxyethylaniline, N-butyl-N-β-hydroxyethylaniline, N-oxyethylpiperidine (that is, N-hydroxyethylpiperidine), N-oxyethylmorpholine (that is, N-hydroxyethylmorpholine), β-hydroxyamylpyridine, and γ-hydroxyethylquinoline, b) diols and triols, more particularly alkoxylated aliphatic, cycloaliphatic, aromatic, and heterocyclic primary amines, such as N-methyldiethanolamine, N-butyldiethanolamine, N-oleyldiethanolamine, N-cyclohexyldiethanolamine, N-methyldiisopropanolamine, N-cyclohexyldiethanolamine, N-methyldiisopropanolamine, N-cyclohexyldiethanolamine, N-N-dioxyethylaniline, N-N-dioxyethyl-N-toluidine, N-N-dioxyethyl-p-toluidine, N-N-dioxypropylnaphthylamine, dioxyethylpiperazine, polyethoxylated butyl diethanolamine, polypropoxylated methyldiethanolamine (in which for polyalkoxylated products the average molecular weight is 250 to 3000), tris[2-hydroxypropyl]amine, N,N'-dimethyl-N,N'-bis(oxyethyl)hydrazine, and N,N'-dimethyl-N,N'-bis(oxypropyl) ethylenediamine, c) amino alcohols obtained, for example, by hydrogenation of addition products of alkylene oxide and acrylonitrile to primary amines, such as N-methyl-N-(3-aminopropyl)ethanolamine, N-cyclohexyl-N-(3-aminopropyl)propanol-(2)-amine, N,N'-bis(3-aminopropyl)ethanolamine, and N-(3-aminopropyl)diethanolamine, d) amines, such as N,N-dimethylethylenediamine, 1-diethyl-amino-4-aminopentane, α-aminopyridine, 3-amino-N-ethylcarbazole, N-N-dimethylpropylene diamine, N-aminopropylpiperidine, N-aminopropylmorpholine, N-aminopropylethyleneimine, and 1,3-bis(piperidino)-2-aminopropane, e) diamines and triamines, more particularly hydrogenation of addition products of acrylonitrile to primary and di-secondary amines, such as bis(3-aminopropyl)methylamine, bis(3-aminopropyl)cyclohexylamine, bis(3-aminopropyl)aniline, bis(3-aminopropyl)toluidine, diaminocarbazole, bis(aminopropoxyethyl)butylamine, and tris(aminopropyl)amine; and 2. Compounds containing carboxyl or hydroxyl groups capable of salt formation, such as the following:

a) hydroxy and mercapto carboxylic acids, such as glycolic acid, thioglycolic acid, lactic acid, trichlorolactic acid, dimethylolpropionic acid, malic acid, dioxymaleic acid, dioxyfumaric acid, tartaric acid, dioxytartaric acid, mucic acid, saccharic acid, citric acid, salicylic acid, 2,6-dioxybenzoic acid, protocatechuic acid, α-resorcylic acid, β-resorcylic acid, hydroquinone-2,5-dicarboxylic acid, 4-hydroxyisophthalic acid, 4,6-dihydroxyisophthalic acid, oxyterephthalic acid, 5,6,7,8-tetrahydronaphthene-(2)-carboxylic acid-(3), 1-hydroxynaphthoic acid-(2), 2,8-dihydroxynaphthoic acid-(3), β-oxypropionic acid, and m-oxybenzoic acid, b) polycarboxylic acids, such as sulfone diacetic acid, nitrilotriacetic acid, ethylenediaminetetraacetic acid, diglycolic acid, thiodiglycolic acid, methylenebisthiole glycolic acid, malonic acid, oxalic acid, succinic acid, glutaric acid, adipic acid, maleic acid, fumaric acid, gallic acid, phthalic acid, tetrachlorophthalic acid, isophthalic acid, terephthalic acid, naphthalene tetracarboxylic acid-(4,5,8), o-tolylimidodiacetic acid, β-naphthylimidodiacetic acid, pyridinedicarboxylic acid, and dithiodipropionic acid, c) aminocarboxylic acids, such as oxaluric acid, anilidoacetic acid, 2-hydroxycarbazolecarboxylic acid-(3), glycine, sarcosine, methionine, α-alanine, β-alanine, 6-aminocaproic acid, 6-benzylamino-2-chlorocaproic acid, 4-aminobutyric acid, aspartic acid, glutamic acid, histidine, anthranilic acid, 2-ethylaminobenzoic acid, N-(2-carboxyphenyl)aminoacetic acid, 2-(3'-aminobenzenesulfonylamino)benzoic acid, 3-aminobenzoic acid, 4-aminobenzoic acid, N-phenylaminoacetic acid, 3,4-diaminobenzoic acid, 5-aminobenzene dicarboxylic acid, and 5-(4-amino-benzoylamino)-2-aminobenzoic acid, d) hydroxy and carboxy sulfonic acids, such as 2-hydroxyethanesulfonic acid, phenolsulfonic acid-(2), phenolsulfonic acid-(3), phenolsulfonic acid-(4), phenoldisulfonic acid-(2,4), sulfoacetic acid, m-sulfobenzoic acid, p-sulfobenzoic acid, benzoic acid-(1)-disulfonic acid-(3,5), 2-chlorobenzoic acid-(1)-sulfonic acid-(4), 2-hydroxybenzoic acid-(1)-sulfonic acid-(5), naphthene-(1)-sulfonic acid, naphthene-(1)-disulfonic acid, 8-chloronaphthene-(1)-disulfonic acid, naphthene-(1)-trisulfonic acid, naphthene-(2)-sulfonic acid-(1), naphthene-(2)-trisulfonic acid, 1,7-dihydroxynaphthalenesulfonic acid-(3), 1,8-dihydroxynaphthalenedisulfonic acid-(2,4), chromotropic acid, 2-hydroxynaphthoic acid-(3)-sulfonic acid-(6), and 2-hydroxycarbazolesulfonic acid-(7), and e) aminosulfonic acids, such as amidosulfonic acid, hydroxylamine monosulfonic acid, hydrazine disulfonic acid, sulfanilic acid, N-phenylaminomethanesulfonic acid, 4,6-dichloroanilinesulfonic acid-(2), phenylenediamine(1,3)-disulfonic acid-(4,6), N-acetylnaphthylamine-(1)-sulfonic acid-(3), naphthylamine-(1)-sulfonic acid, naphthylamine-(2)-sulfonic acid, naphthylaminedisulfonic acid, naphthylaminetrisulfonic acid, 4,4'-di(p-amino-benzoylamino)diphenylurea-disulfonic acid-(3,3'), phenyl hydrazine disulfonic acid-(2,5), 2,3-dimethyl-4-aminoazobenzenedisulfonic acid-(4',5), 4'-aminostilbenedisulfonic acid-(2,2')-(4-azo-4)anisole, carbazoledisulfonic acid-(2,7), taurine, methyltaurine, butyltaurine, 3-aminobenzoic acid-(1)-sulfonic acid-(5), 3-aminotoluene-N-methanesulfuric acid, 6-nitro-1,3-dimethylbenzene-4-sulfamic acid, 4,6-diaminobenzenedisulfonic acid-(1,3), 2,4-diaminotoluenesulfonic acid-(5), 4,4'-diaminodiphenyldisulfonic acid-(2,2'), 2-aminophenolsulfonic acid-(4), 4,4'-diaminodiphenyl ether sulfonic acid-(2), 2-aminoanisole-N-methanesulfonic acid, 2-aminodiphenylaminesulfonic acid.

The salt-forming agents for compounds in group 1 above can be inorganic or organic acids or compounds with reactive halogen atoms or the corresponding esters of strong acids. Examples include hydrochloric acid, nitric acid, hypophosphorous acid, amidosulfonic acid, hydroxylamine monosulfonic acid, formic acid, acetic acid, glycolic acid, lactic acid, chloroacetic acid, bromoacetic acid ethyl ester; methyl chloride, butyl bromide, dimethyl sulfate, diethyl sulfate, benzyl chloride, p-toluenesulfonic acid methyl ester, methyl bromide, ethylene chlorohydrin, ethylene bromohydrin, glycerol-α-bromohydrin, chloroacetic ester, chloroacetic amide, bromoacetic amide, dibromomethane, chlorobromobutane, and dibromobutane.

The salt-forming agents for compounds in group 2 above can be inorganic or organic bases. Examples include sodium hydroxide, potassium hydroxide, potassium carbonate, sodium hydrogen carbonate, ammonia, or primary, secondary, or tertiary imines.

Organic phosphorus compounds can also be used for salt forming, including either basic phosphines capable of incorporation, such as diethyl-β-hydroxyethylphosphine, methyl-β-hydroxyethylphosphine, or trisphydroxymethylphosphine, or bis-(α-hydroxyisopropyl)phosphinic acid, hydroxyalkanephosphonic acid, or phosphoric acid-bisglycolic ester.

The salt-forming substances can react with or without solvents.

The preferred components (b) are, therefore, polyhydroxy carboxylic or sulfonic acids, polyaminocarboxylic or sulfonic acids, or salts of these compounds (mainly alkali metal and ammonium salts, more particularly the sodium and potassium salts).

The class of sulfonate diols are particularly preferred compounds for use as component (b). Suitable compounds in this class of preferred compounds are described, for example, in German Offenlegungsschrift 2,446,440, and usually correspond to the formula

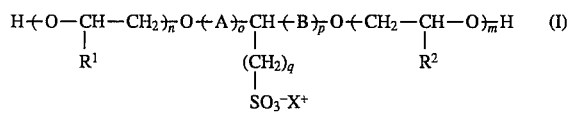

in which

A and B are the same or different divalent aliphatic hydrocarbon groups with 1 to 6 carbon atoms, $R^1$ and $R^2$ are independently hydrogen, an aliphatic hydrocarbon group with 1 to 4 carbon atoms, or a phenyl group, $X^+$ is an alkali metal cation or an optionally substituted ammonium group, n and m are independently zero or numbers from 1 to 30, o and p are independently zero or 1, and q is 0, 1, or 2.

Preferred compounds (b) of formula I correspond to the formulas

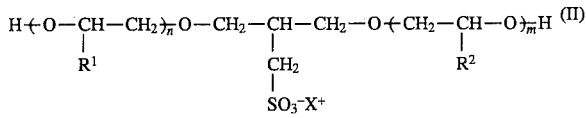
(II)

and

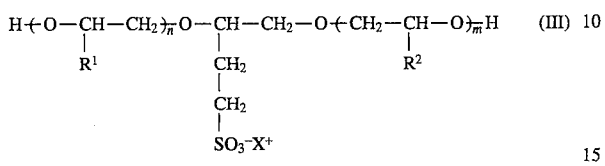
(III)

in which

R¹ and R² are independently hydrogen or methyl, n and m are independently zero or numbers from 1 to 3, and X⁺ has the same meaning as in formula I.

Compounds (b) are used in a quantity such that the blocked polyisocyanates according to the invention have the ionic group content specified in the claims. If the ionic groups are those introduced by blocking the isocyanate groups with inorganic blocking agents, more particularly with sodium hydrogen sulfite, the content of ionic groups will, of course, be mainly determined by the number of isocyanate groups to be blocked, and can therefore without difficulty amount to up to 75 milliequivalents per 100 g of blocked polyisocyanate. If organic NCO blocking agents are used which (unlike, for example, sodium hydrogen sulfite) do not introduce any ionic groups into the polyisocyanate molecule, the content of ionic groups will be near the bottom end of the defined range, preferably 2 to 25 milliequivalent per 100 g of blocked isocyanate. This latter situation is the case where the ionic groups, after deblocking the blocked isocyanate groups, remain a component of the deblocked polyisocyanate.

Some particularly preferred components (b) of formula I are sulfonate diols having the formula

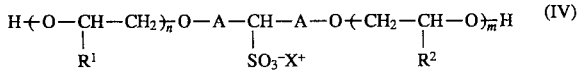
(IV)

in which

R¹ and R² are independently hydrogen or methyl,

A is a divalent aliphatic $C_1$–$C_4$-hydrocarbon group (preferably methylene),

X⁺ is an alkali-metal cation or an ammonium group, and n and m are independently integers from 1 to 20.

Preferred cations X⁺ comprise potassium, sodium and ammonium ions in which the ammonium nitrogen can be substituted by up to four organic $C_1$–$C_{10}$ groups. Two such ammonium substituents can be replaced by one divalent 4- or 5-member group optionally containing heteroatoms (such as oxygen, nitrogen, or sulfur) so as to form, in conjunction with the ammonium nitrogen atom, a heterocyclic ring, such as a morpholine or hexahydropyridine ring.

Preferred components (c) comprise mono- and polyvalent (more particularly mono-, di- and trivalent) polyether alcohols. Suitable components (c), therefore, mainly comprise poly($C_2$–$C_6$-alkylene) (preferably poly($C_2$–$C_3$-alkylene) ethers started on mono-, di-, or trivalent alcohols. Monohydric alcohols are preferred starters, and monohydric $C_1$–$C_6$ alcohols are particularly preferred starters. Suitable starter molecules for preparing mono-functional components (c)

comprise, for example, methanol, ethanol, propanols, butanols, pentanols, hexanols, cyclohexanol and compounds of the formulae

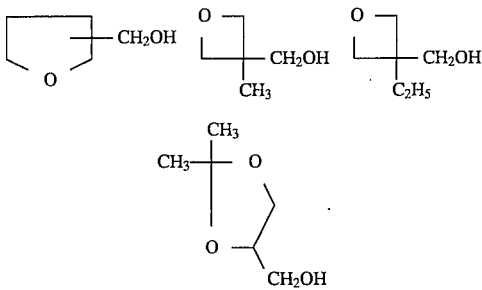

Preferred components (c) have number average molecular weights of from 300 to 3000. Most preferred monofunctional components (c) are monomethyl-, monoethyl-, monopropyl-, and monobutyl ethers of polyethylene glycols such as, for example, the polyethylene glycols started on methanol available as MPEG products from Dow Chemical Corporation, in particular MPEG-300, MPEG-500 and MPEG-750.

Other preferred monofunctional components (c) comprise monohydric poly(ethylene oxide/propylene oxide) block copolymers started on $C_1$–$C_6$ alcohols and having at least 65 tool-% of ethylene oxide units and at most 35 mol-% propylene oxide units, based on the sum of alkylene oxide units derived from the addition reaction of alkylene oxide to the starter compound. As far as block copolyethers are concerned, the starter unit can be linked to the polyethylene oxide block or to the polypropylene oxide block, which means that the free hydroxyl group can be linked to a propylene oxide unit in the former case or to an ethylene oxide unit in the latter case. Instead of hydroxyl terminal groups, the polyalkylene ethers (c) can carry amino or mercapto terminal groups.

The blocked polyisocyanates according to the invention preferably have a content of incorporated polyalkylene ether groups, calculated as recurrent alkylene oxy groups [O-alkylene-]$_x$, of 3 to 25 wt. % relative to blocked polyisocyanate (irrespective of whether the polyalkylene ether groups have been introduced via components (b), (c) or (d)). The alkylene oxy content is preferably 3 to 15 wt. % for waterproofing or oil-proofing textiles and 10 to 25 wt. % for improvement of textile (that is, "crease-resisting finish"). Preferably, the polyalkylene ether groups contain 50 to 100 wt. % ethylene oxide units, preferably accompanied exclusively by propylene oxide units. The preferred substances, therefore, are ethylene oxide polyethers and ethylene/propylene oxide copolyethers with a predominant proportion by weight of ethylene oxide units. Pure ethylene oxide polyethers are especially preferred. The incorporated polyethylene oxide blocks can have an average molecule weight of 500 to 6000 (preferably 500 to 3000).

Suitable components (e) for producing the blocked polyisocyanates according to the invention comprise NCO-reactive compounds different from (b) and (c), such as polyhydroxyl compounds containing 2 to 8 (preferably 2 or 3) hydroxyl groups per molecule and having an (average) molecular weight of up to 10,000 (preferably up to 6000). These substances can be low-molecular polyhydroxyl compounds with molecular weights of 62 to 499 or higher-molecular polyhydroxyl compounds with average molecular weights of at least 500 (preferably at least 1000).

Low-molecular polyhydroxyl compounds ("chain-extending agents") comprise a wide variety of diols, such as the following:

(i) alkane diols such as ethylene glycol, propylene glycol-1,3 and propylene glycol-1,2, butanediol-1,4, pentanediol-1,5, dimethylpropanediol-1,3, or hexanediol-1,6;

(ii) ether diols which, in the case of polyalkylene ether diols, contain not more than four recurrent alkylene oxy groups, such as diethylene glycol, triethylene glycol, or 1,4-phenylene-bis(β-hydroxyethyl ether);

(iii) ester diols having the formulas:

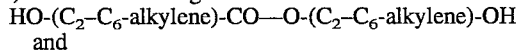
and
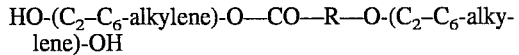

in which R is an alkylene or arylene group with 1 to 10 (preferably 2 to 6) carbon atoms, such as δhydroxy-butyl-ε-hydroxycaproic acid ester, ω-hydroxyhexyl-γ-hydroxy-butyric acid ester, adipic acid bis-(β-hydroxyethyl) ester, terephthalic acid bis(α-hydroxyethyl) ester and α-methyl-α-hydroxymethylpropionic acid neopentyl glycol monoester ("ester diol 204").

The "chain-extending agents" can also be polyamines (preferably aliphatic or aromatic diamines), such as ethylene diamine, propylene diamine-1,2 and -1,3, 1,4-tetramethylene diamine, 1,6-hexamethylene diamine, N,N'-diisobutyl-1,6-hexamethylene diamine, 1,11-undecamethylene diamine, cyclohexane-1,3- or 1,4-diamine or mixtures thereof, 1-amino-3,3,5-trimethyl-5-aminomethylcyclohexane, 2,4- and 2,6-hexahydro-toluene diamine and mixtures thereof, perhydro- 2,4'-and -4,4'-diaminodiphenylmethane and the 3,3,'-dimethyl derivative thereof, and bis(3-aminopropyl)methylamine; p-xylylenediamine, bis-anthranilic acid esters such as those described in German Offenlegungsschriften 2,040,644 and 2,160,590, 3,5- and 2,4,-diaminobenzoic acid esters such as those described in German Offenlegungsschrift 2,025,900, diamines containing ester groups such as those described in German Offenlegungsschriften 1,803,635, 2,040,650 and 2,160,589, and 3,3'-dichloro-4,4'-diaminodiphenylmethane, toluene diamine, 4,4'-diaminodiphenyl-methane and 4,4'-diaminodiphenyldisulfide.

The diamine chain extending agents can also be hydrazine, hydrazine hydrate, or substituted hydrazines, such as methylhydrazine, N,N'-dimethylhydrazine or homologs thereof, or acid dihydrazides, such as carbodihydrazide, oxalic acid dihydrazide and the dihydrazides of malonic acid, succinic acid, glutaric acid, adipic acid, β-methyl adipic acid, sebacic acid, hydracrylic acid, or terephthalic acid, semicarbazido-alkylene hydrazides, such as β-semicarbazidopropionic acid hydrazide (German Offenlegungsschrift 1,770,591), semicarbazido alkylene carbazinic esters such as 2-semicarbazidoethyl carbazinic ester (German Offenlegungsschrift 1,918,504), or amino semicarbazido compounds such as β-aminoethyl semicarbazido carbonate (German Offenlegungsschrift 1,902,931).

Other possible isocyanate-reactive components (e) for preparing the blocked polyisocyanates according to the invention include tri- and tetravalent alcohols such as glycerol, trimethylol ethane, trimethylol propane, trimethylol hexane or pentaerythritol.

Components (e) may also be conventional HO-, HS- and/or NH-terminal polyesters used in polyurethane chemistry, or polycarbonates or polyacetals such as simple polyester diols having an average molecular weight below 2000 and prepared, for example, by reacting adipic acid or phthalic acid with excess quantities of alkane diols such as ethylene glycol, tetramethylene glycol, or hexamethylene glycol.

Advantageously also, the starting compounds for preparing the blocked isocyanates according to the invention are selected so as to produce branched products. Advantageous products for the purposes of the present invention are obtained if the total functionality of the polyisocyanates according to the invention is greater than 2.0 (preferably greater than 2.5, more preferably 2.8 to 4.0). The "total functionality" according to the invention means the average number of (blocked) isocyanate groups per molecule. For example, polyisocyanates (a) with an average of more than 2.0 (preferably more than 2.5, more preferably 2.8 to 4.0) isocyanate groups per molecule are used, provided that the other reacting substances are compounds with two NCO-reactive groups per molecule. For the purpose of the invention, of course, the manner of producing branching sites is not critical. Consequently, isocyanates with three or more isocyanate groups, such as the triisocyanates listed above in (a), including the trimers, biurets, allophanates, and urethanes that can be obtained from diisocyanates, can be replaced by the equivalent quantity of polyfunctional NCO-reactive compounds, such as triols. One skilled in the art can choose appropriate conditions under which gelling is reliably prevented.

Non-blocked intermediates for use in the production of the blocked polyisocyanates according to the invention can be obtained by reacting the polyisocyanates (a) with components (b), (c) and optionally (e) simultaneously or in any sequence. The reaction temperature is preferably 50 to 120° C. and the reaction usually takes 1 to 3 hours.

In the reaction according to the invention, the polyisocyanates containing free isocyanate groups and obtained from (a), (b), (c) and optionally (e) are reacted in a last step with an NCO-blocking agent (d) unless incorporation of ionic groups and blocking occur simultaneously due to the use of inorganic blocking agents such as alkali-metal hydrogen sulfites.

If inorganic blocking agents such as alkali-metal hydrogen sulfites are used, the preferred manner of operation is as follows. Additional ionic groups of the previously described kind, as well as the ionic groups introduced by the blocking agent, are selected to obtain a proportion of 2 to 25 meq per 100 g of finished product (that is, blocked polyisocyanate according to the invention). The preferred reaction temperature is 50° to 120° C. Products obtained in this preferred embodiment have specially advantageous properties if they are first modified before being blocked. In this special case, it has been found that the properties of the finished products are particularly advantageous if the ionic groups of the previously described kind are cations.

The blocking agents (d) may more particularly be compounds with preferably one group capable of reacting with isocyanate groups and undergoing an addition reaction with organic isocyanates above 50° C. (preferably between 60° and 100° C.). Examples of suitable blocking agents include secondary or tertiary alcohols such as isopropanol or tert-butanol, C—H acid compounds such as malonic acid dialkyl esters, acetyl acetone, acetoacetic acid alkyl esters, oximes such as formaldoxime, acetaldoxime, methyl ethyl ketone oxime, cyclohexanone oxime, acetophenone oxime, benzophenone oxime, or diethyl glyoxime, lactams such as ε-caprolactam, δ-valerolactam, γ-butyrolactam, phenols such as phenol, o-methylphenol, N-alkylamides such as N-methylacetamide or imides such as phthalimide, imidazole, or triazole. In carrying out the process of the invention, it is preferable to use methyl ethyl ketoxime, ε-caprolactam, or C—H acid compounds such as malonic acid $C_1$–$C_4$ alkyl esters (preferably malonic acid diethyl ester), acetoacetic acid $C_1$–$C_4$ alkyl esters (preferably acetoacetic acid ethyl ester), or acetylacetone.

In order to produce the blocked polyisocyanates according to the invention, the unblocked polyisocyanates from the first reaction stage or stages are reacted preferably with a quantity of blocking agent corresponding to an equivalent ratio of NCO groups to NCO-reactive groups (of the blocking agent) of 1:0.95 to 1:1.15 (preferably 1:1 to 1:1.1). When blocking agents comprising active methylene groups are used, it is advantageous to use basic catalysts such as diazabicyclooctane, triethylamine, alkali-metal alcoholates, or alkalimetal phenolates, such as sodium ethylate or sodium phenolate. When blocking agents with OH or NH groups are used, it may be advantageous to catalyze the blocking reaction with a metal salt such as dibutyltin dilaurate or tin octoate.

The last step in the reaction is, of course, simple. That is, the reaction can be continued, within the previously given time and temperature range, until all NCO groups have been consumed.

Although it is often particularly advantageous to prepare the blocked polyisocyanates according to the invention in the absence of organic solvents, organic solvents can, of course, also be used. It is normally advisable to use organic solvents when preparing viscoplastic or solid blocked polyisocyanates according to the invention.

Preferred organic solvents include inter alia ketones, such as acetone, methyl ethyl ketone, or cyclohexanone; ethers, such as diethyl or dibutyl ether, tetrahydrofuran, and dioxane; ethers and/or esters of ethylene glycol and propylene glycol, such as ethylene glycol monomethyl and monoethyl ether, ethylene glycol monomethyl and monoethyl ether acetate, $C_2$–$C_4$-carboxylic acid $C_1$–$C_6$-alkyl esters, such as ethyl acetic and butyl ester; amides, such as N,N'-dimethylformamide, N,N'-dimethylacetamide, or N-methylpyrrolidone; sulfolan; N-methylcaprolactam; propylene glycol diacetate; benzine; or aromatics, such as benzene, toluene, or xylenes. It is not advisable to use organic solvents containing NCO-reactive groups, such as methanol, ethanol, propanol, or isopropanol, during manufacture of the blocked polyisocyanates according to the invention. If required, the organic solvents can be subsequently removed from the blocked isocyanates according to the invention, for example, by distillation.

The blocked isocyanates according to the invention are extremely suitable for producing aqueous dispersions and are preferably used in this form. The content of blocked isocyanates according to the invention in the aqueous dispersions can vary within wide limits and is usually 20 to 80 wt. % (preferably 25 to 50 wt. %). The blocked polyisocyanates according to the invention may also be dispersed by adding the blocked polyisocyanate to water. The substances are combined advantageously during agitation. The dispersion process can occur in the absence or the presence of organic, preferably water-miscible, solvents. The organic solvents may be the previously mentioned solvents but may also include compounds that carry NCO-reactive groups and can act as solvents, for example, alcohols such as methanol, ethanol, propanol, or isopropanol.

The use of organic solvents, preferably water-miscible solvents, is particularly preferred when the aqueous dispersion is to contain more than 50 wt. % of blocked polyisocyanate according to the invention. For example, after the last reaction step the blocked polyisocyanate according to the invention can be dissolved in a water-dilutable organic solvent such as isopropanol until the content of blocked polyisocyanate according to the invention is 80 to 95 wt. % relative to the total organic solvent and blocked polyisocyanate according to the invention. The resultant organic solution can then be further diluted with water.

Because the blocked polyisocyanates according to the invention usually form dispersions spontaneously with water, it is often unnecessary to use organic solvents for dispersion.

The temperature during dispersion can usually be 20 to 100° C. (preferably 30° to 80° C.). The resultant aqueous dispersions contain the blocked polyisocyanates according to the invention, usually in the form of particles with an average diameter $d_{50}$ of 50 to 500 mµ (preferably 100 to 300 mµ).

The average particle diameter $d_{50}$ is the diameter at which 50 wt. % of the particles are above and 50 wt. % of the particles are below. The value of $d_{50}$ can be determined by ultracentrifuge measurements (W. Scholtan, H. Lange, *Kolloid. Z. and Z. Polymere*, 250, 782–796 (1972)) or by electron microscopy and subsequent particle counting (G. Kampf, H. Schuster, *Angew Makromolekulare Chemie*, 14, 111∝129 (1970)).

Aqueous dispersions containing the blocked polyisocyanates according to the invention in the form of a dispersed phase can be stored for more than one year at room temperature or for more than twelve weeks at 50° C.

The blocked polyisocyanates according to the invention, preferably in the form of their aqueous dispersions, can be used for high finishing of textiles, as well as for waterproofing and oil-proofing of textiles.

High-finishing of textiles includes crease-resistant finishing of textile materials from natural or regenerated cellulose (cotton or viscose). The purpose of crease-resisting finishing is substantially to retain the dimensions, shape, and smooth appearance during normal use, particularly during washing and drying. It is known that cellulose fibers must be cross-linked for this purpose. In the long run, finishing agents for the textile industry will be successful only if they can be used in an aqueous liquor. Therefore, only water-soluble or water-dispersible products can be considered as crease-resisting finishing agents. Until now, the preferred crease-resisting substances have been compounds carrying methylol groups, such as dimethylol ethylene urea, dimethylol dihydroxyethylene urea, or urea-formaldehyde or melamine-formaldehyde condensates. Because, however, formaldehyde-based substances include products that liberate formaldehyde in very small quantities, it is desirable to have crease-resisting agents that are free from methylol groups.

Attempts have also been made to cross-link the cellulose fibers, as required for crease-resistance, by using polycarboxylic acids in the presence of catalysts. Compare, for example, European Patent Application 354,648). This method, however, has very adverse effects on the tearing and abrasion strength of the resultant cellulose fibers.

The use of unblocked or blocked polyisocyanates as crease-resisting materials has also been discussed, for example, in *Textilveredelung*, 2 (7), 441 et seq. (1967); *Textilveredelung*, 13 (11), 454–457 (1978); *Ind. Eng. Chem. Prod. Res. Dev.*, 21 (1), 4–11 (1982). The improvement in crease resistance is, however, still inadequate, particularly with regard to dry crease angle, shrinkage during washing, and self-smoothing.

It has been found that the blocked polyisocyanates according to the invention are free or largely free from the disadvantages of the prior art and are gratifyingly superior to the previously known crease-resisting agents.

The blocked polyisocyanates according to the invention are usually added to the aqueous impregnating liquor. The liquor can be applied in conventional manner used in the textile industry, for example, by padding, slop padding, spraying, or foam application. The concentration of blocked polyisocyanates according to the invention can be varied within wide limits, depending mainly on the method of application. Depending on the finished textiles, the anti-crease agents in the impregnating liquor are usually added in quantities of 0.5 to 5 wt. %. The pH of the liquor is usually adjusted to pH 4–7 (preferably pH 5–6). Of course, the liquor can contain other substances besides the blocked polyisocyanates according to the invention, for example, antistatic agents, softeners, anti-slip agents, or water-repellents such as polysiloxanes or the like.

The textiles treated with the impregnating liquor are advantageously dried at 80° to 110° C., preferably followed by additional heating to 130° to 200° C. for 30 seconds to 6 minutes so that the blocked isocyanate groups react and can then exert their intrinsic crease-resisting action.

The blocked polyisocyanates according to the invention, because of the hydrophilic groups therein, are self-dispersible in water and can also serve as emulsifiers for water-repellent materials. Due to this property, they can be used in combination with water or oil-repellent products as textile-finishing agents for making textile fibers hydrophobic and oleophobic (that is, resistant to water, dirt, and oil).

Modern textile materials, used, for example, as furniture coverings and/or textile floor coverings, are expected to have good properties with regard to mechanical stress, that is, static and dynamic load-bearing capacity and insensitivity to water, oil, and/or dirt.

A serious problem with textiles having three-dimensional structure, that is, having a surface structure produced by loops or slit loops (that is, velours) and subjected to severe stress during use, is the difficulty of keeping them clean for a long period. Dirt must be easy to remove, leaving little or no residues on the material and not appreciably affecting the appearance of the textile.

The dirt can have, for example, the following composition and consistency: oil and oily substances, liquid, aqueous colored substances, inorganic dry pigment-like substances (street dirt), as well as aqueous suspensions and mixtures of the aforementioned substances.

The purpose of anti-dirt finishing agents is to give hydrophobic and oleophobic properties to the textile, thereby preventing the penetration of liquid dirt. Dry dirt does not adhere to the fibers and can easily be removed, for example, by a vacuum cleaner.

One important class of the aforementioned water-proofing and/or oil-proofing agents for textile finishing is highly-fluorinated organic compounds (usually fluorocarbon resins). It has been found that substances containing such fluorinated water-proofing and/or oil-proofing agents and blocked polyisocyanates according to the invention can unexpectedly provide the finished textiles with a desirable combination of superior properties, that is, (i) water-proofing and oil-proofing finishing with high resistance to repeated washing and cleaning, (ii) further improved repellency of dry dirt, and (iii) easier soil release and improved protection against soil redeposition, that is, against dirt settling out of the washing liquor onto the textile. The term "water-proofing/oil-proofing finishing" as used herein comprises finishing with blocked polyisocyanates according to the invention and fluorinated organic compounds, irrespective of which of the properties (i), (ii), or (iii) is most prominent.

Preferred fluorinated organic compounds for water-proofing and soil-proofing finishing usually contain 0.2 to 65 wt. % (preferably 1 to 35 wt. %) fluorine, the fluorine being bonded in perfluoro-$C_3$-$C_{20}$-alkyl groups containing up to one hydrogen or chlorine atom for each two carbon atoms in addition to the fluorine atoms. Preferred fluorinated organic compounds contain no hydroxyl groups. The perfluoroalkyl chain can be interrupted by oxygen atoms. The perfluoroalkyl groups can be components of monomeric or polymeric compound that are normally insoluble in water. Examples of such compounds include polyacrylates containing perfluoroalkyl groups (compare, for example, German Auslegeschriften 1,595,017 and 1,595,018, German Offenlegungsschrift 2,939,549, German Auslegeschriften 2,134,978, 2,660,200, 1,106,960, and 1,745,089), or urethanes and polyurethanes containing perfluoroalkyl groups (compare, for example, German Offenlegungsschrift 1,468,295, German Auslegeschrift 1,794,356, German Patentschrift 2,702,305, German Auslegeschrift 1,795,261, and German Offenlegungsschrift 1,956,198), or esters of aromatic and aliphatic dicarboxylic and polycarboxylic acids containing perfluoroalkyl groups (compare, for example, German Offenlegungsschrift 3,002,369, European Patent Application 19,732, and German Offenlegungsschrift 3,117,071 and 2,015,332). Preferred fluorinated organic compounds are perfluoroalkyl polymers (usually commercially available) derived from styrene, vinyl, vinylidene, acrylic, methacrylic, and α-chloroacrylic polymers containing perfluoroalkyl groups. Some examples of these products are homopolymers and copolymers of the following compounds:

$C_5F_{11}$—$CH_2$—$O_2C$—C($CH_3$)=$CH_2$
$C_7F_{15}$—$CH_2$—$O_2C$—C—C($CH_3$)=$CH_2$
$C_9F_{19}$—$CH_2$—$O_2C$—CH=$CH_2$
$C_8F_{17}$—$SO_2N(C_2H_5)$—$C_2H_4$—$O_2C$—C($CH_3$)=$CH_2$
$C_8F_{17}$—$SO_2N(CH_3)$—$C_2H_4$—$O_2C$—CH=$CH_2$
$C_8F_{17}$—$CON(C_2H_5)$—$C_2H_4$—$O_2C$—C($CH_3$)=$CH_2$
$C_8F_{17}$—$C_2H_4$—$O_2C$—C($CH_3$)=$CH_2$
$C_8F_{17}$—$SO_2N(CH_3)$—CO—C($CH_3$)=$CH_2$
$C_8F_{17}$—$C_2H_4$—CH=CH—$CO_2$—$C_2H_4$—$C_8H_{17}$
$C_8F_{17}$—$SO_2N(C_3H_7)$—$C_2H_4$—$O_2C$—CH=$CH_2$
$C_8F_{17}$—$SO_2N(CH_3)$—$C_{11}H_{22}$—$O_2C$—CH=$CH_2$
$C_8F_{17}$—$SO_2N(CH_3)$—$C_{10}H_{20}$—$O_2C$—CH=$CH_2$
$C_8F_{17}$—$SO_2N(CH_3)$—$C_{11}H_{22}$—$O_{2C}$—$_c$($CH_3$)=$CH_2$
$C_5F_{11}$—$CH_2$—COO—C($CH_3$)=$CH_2$
$C_7F_{15}$—$CH_2$—COO—C($CH_3$)=$CH_2$
$C_8F_{17}$—$SO_2N(C_2H_5)$—$C_2H_4$—COO—CH=$CH_2$
$C_7F_{15}$—$C_3H_6$—COO—CH=$CH_2$
$C_4F_9$—COO—$CH_2$—CH=$CH_2$
$C_8F_{17}$—$SO_2N(C_2H_5)$—CO—CH=$CH_2$
$C_7F_{15}$—$CH_2$—$O_2C$—CH=CH—$CO_2$—$CH_2$—$C_7F_{15}$
$C_3F_7$—$CH_2$—$O_2C$—CF=$CH_2$
$C_3F_7$—$CH_2$—$O_2C$—CF=$CF_2$
$(C_3F_7)_3C$—$CH_2$—$O_2C$—CH=$CH_2$
$C_8F_{17}$—$(CH_2)_3$—$O_2C$—CH=$CH_2$
$C_8F_{17}$—CO—$(CH_2)_3$—$O_2C$—CH=$CH_2$
$C_8F_{17}$—$(CH_2)_{11}$—$O_2C$—C($CH_3$)=$CH_2$
$C_8F_{17}$—$SO_2$—$CH_2CH_2$—$O_2C$—CH=$CH_2$
$C_8F_{17}$—SO—$CH_2CH_2$—$O_2C$—CH=$CH_2$
$C_{12}F_{25}$—$SO_2NH$—$(CH_2)_{11}$—$O_2C$—C($CH_3$)=$CH_2$
$C_{12}F_{25}$—$SO_2$—$C_6H_4$—CH=$CH_2$

N-butylperfluoroctanesulfonamidoethyl acrylate, N-ethylperfluoroctanesulfonamidoethyl methacrylate, N-methylperfluorobutanesulfonamidobutyl acrylate, N-ethylperfluoroctanesulfonamidoethyl α-chloroacrylate, 1,1-dihydroperfluorohexyl acrylate, 1,1-dihydroperfluorodecyl methacrylate, 1,1-dihydroperfluorooctyl ω-chloroacrylate, 3-(perfluorooctyl)propyl acrylate, 2-(perfluoroheptyl)ethyl methacrylate, 11-(perfluorooctyl)undecyl acrylate, and 3-(perfluoroheptyl)propyl chloroacrylate.

Preferred fluorinated organic compounds include, for example, homopolymers and copolymers containing repeating units having the formula

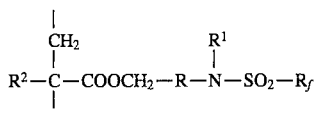 (V)

in which

R denotes C1–C12 alkylene, $R_f$ denotes perfluoro-$C_4$–$C_{12}$-alkyl, $R^1$ denotes C1–C6-alkyl, and $R^2$ denotes hydrogen or methyl.

Copolymers with repeating units of formula V can contain other incorporated monomers, for example, styrene, vinyl acetate, and/or vinyl chloride. These homo- and copolymers are described, for example, in U.S. Pat. No. 2,803,615.

Other preferred fluorinated organic compounds include copolymers of fluoroalkyl (meth)acrylates and N-methylol (meth)acrylamide. These copolymers are described, for example, in German Auslegeschrift 1,419,505.

Other preferred fluorinated organic compounds include copolymers of monomers containing perfluoroalkyl groups, monomers containing hydroxyl groups, such as hydroxyethyl (meth)acrylate or hydroxypropyl (meth)acrylate, and optional other polymerizable ethylenically unsaturated monomers. These copolymers are described, for example, in German Auslegeschrift 1,595,017.

Other preferred fluorinated organic compounds include copolymers of monomers containing fluoroalkyl groups, compounds having the formula

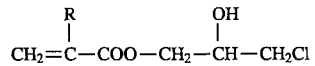 (VI)

in which R denotes hydrogen or methyl, or optionally other polymerizable ethylenically unsaturated monomers such as (meth)acrylic acid and its alkyl esters (for example, stearyl (meth)acrylate). These copolymers are described, for example, in German Offenlegungsschrift 2,939,549.

Other preferred fluorinated organic compounds include reactive homopolymers and copolymers containing perfluoroalkyl groups, the reactive groups being hydroxyl groups or $C_1$–$C_3$ alkoxy groups. These homo- and copolymers are described, for example, in European Patent Application 196,309.

Some particularly preferred fluorinated organic compounds are homopolymers and copolymers of compounds having the formulas

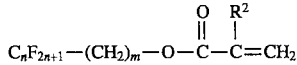 (VIIa)

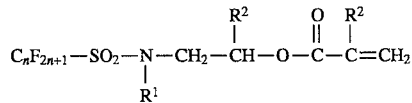 (VIIb)

and

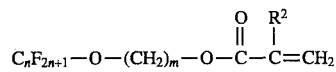 (VIIc)

in which $R^1$ denotes $C_1$–$C_4$ alkyl (preferably $C_1$–$C_2$ alkyl), $R^2$ denotes hydrogen or methyl, m is an integer of from 1 to 4 (preferably 2), and n is an integer of from 4 to 12 (preferably 6 to 8).

Particularly suitable monomers free from perfluoroalkyl groups include compounds having the formula

 (VIII)

in which $R^3$ denotes hydrogen, methyl, or fluorine (preferably hydrogen or methyl), and $R^4$ denotes a $C_8$–$C_{22}$ (preferably $C_{12}$–$C_{22}$) alkyl or alkenyl group.

Examples of such polymerizable monomers VIII include acrylic and methacrylic acid esters of behenyl alcohol, stearyl alcohol, oleyl alcohol, nonyl alcohol, or octyl alcohol, including the isomer mixtures of these alcohols.

Other particularly suitable monomers not containing perfluoroalkyl groups are compounds having the formulas

 (IXa)

 (IXb)

 (IXc)

in which $R^3$ denotes hydrogen, methyl, or fluorine, $R^5$ denotes $C_1$–$C_7$-alkyl, $R^6$ denotes $C_1$–$C_7$-alkyl, —$CH_2$—OH, —$CH_2$—$OCH_3$, —$CH_2$—$O_2C$—$CH_3$, or

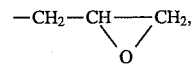

$R^7$ denotes hydrogen, methyl, fluorine, or chlorine, $R^8$ denotes chlorine, fluorine, $OR^1$, phenyl —$O_2C$—$R^9$, or CN and $R^9$ denotes $C_1$–$C_4$-alkyl.

Some particularly preferred monomers IX are vinyl esters such as vinyl acetate and vinyl propionate or acrylic and methacrylic esters of $C_1$–$C_4$ alcohols.

Particularly preferred fluorine-containing copolymers of this kind contain copolymerised units of the various monomers in the following proportions: Perfluoroalkyl monomers having the formulas (VII): 15 to 70 wt. % (preferably 25 to 60 wt. %), Monomers of formula (VIII): 5 to 50 wt. % (preferably 10 to 45 wt. %), and Monomers of formula (IX): 15 to 65 wt. % (preferably 20 to 55 wt. %).

These homopolymers and copolymers and methods of producing them are described, for example, in German Offenlegungsschriften 3,935,859 and 4,012,630.

For the purpose of textile finishing, the fluorinated organic compounds and the blocked polyisocyanates according to the invention can be used in a ratio by weight of 12:1 to 1:1 (preferably 6:1 to 2:1) relative to solids in each case.

The wash-resistant and cleaning-resistant water-proofing and oil-proofing finishing mentioned under (i) above are particularly important properties for outer clothing, canvas blinds, and textiles in general.

The improved repellency of dry dirt mentioned under (ii) above is particularly important for carpets. In a preferred embodiment, particularly advantageous dirt-repelling properties are obtained if the fluorinated organic component is a mixture of (A) 50 to 80 parts by weight of an aqueous colloidal suspension of organosil sesquioxanes of units having the empirical formula $RSiO_{3/2}$ (in which R is optionally substituted alkyl or aryl group with up to 7 carbon atoms ) and/or cocondensates of hydrolysates of tetraalkoxy silanes with organo-trialkoxysilanes containing $RSiO_{3/2}$ or $SiO_2$ units in the form of a sol and (B) 20 to 50 parts by weight of an aqueous dispersion containing 5 to 65 wt. % of a polymer containing fluorine groups and having a fluorine content of 0.2 to 40 wt. %.

Component (A) can be organosil sesquioxanes as described, for example, in German Auslegeschrift 1,594,985 or German Offenlegungsschrift 3,004,824. These substances can be prepared, for example, by adding silanes having the formula $R-Si(OR')_3$, either alone or together with silanes having the formula $Si(OR')_4$, in which R is a substituted or unsubstituted hydrocarbon group having 1 to 7 carbon atoms (optionally substituted with halogen atoms or amino, mercapto, or epoxy groups) and up to 95% of the groups R are methyl and in which R' is an alkyl group containing 1 to 4 carbon atoms, to a mixture of water, a buffer substance, a surface-active agent, and optionally an organic solvent with agitation and under acid or basic conditions.

The simultaneous hydrolysis of silanes results in copolymers of sesquioxanes, in which the units can be in block form or statistically distributed. The preferred quantity of added silane of formula $Si(OR')_4$ is 2 to 50 wt. % (preferably 3 to 20 wt. %) relative to the total quantity of silanes used.

Mixtures of (A) and (B) of this kind for textile finishing are described, for example, in German Offenlegungsschrift 3,307,420 (believed to correspond to U.S. Pat. No. 4,781, 844). As before, of course, the previously recommended weight ratio of the fluorinated organic compound to the blocked polyisocyanate according to the invention is 12:1 to 1:1 (preferably 6:1 to 2:1).

The soil release properties mentioned under (iii) above and the increased protection against soil redeposition is particularly important for table linen and for work clothing.

The blocked polyisocyanates according to the invention are applied in combination with water-proofing and oil-proofing fluorocarbon resins as previously mentioned, preferably in the form of an aqueous dispersion.

The finishing liquor for water-proofing and oil-proofing can, of course, contain other conventional textile adjuvants. See, for example, Chwala/Anger, *Handbuch der Textilhilfsmittel*, Verlag Chemie, Weinheim, 1977, and Rath, *Lehrbuch der Textilchemie*, Springer-Verlag, Heidelberg, 1963. Examples of such conventional textile adjuvants include crease-resisting and softening agents, optionally with associated catalysts; flame retardants; finishing agents; and water-proofing agents based on (α) emulsions of paraffins and metal salts (preferably zirconium salt), (β) mixtures of fatty acids, melamine/formaldehyde condensates, and paraffins, and (γ) emulsions of polydimethylsiloxanes and hydrogen-methylsiloxanes. These textile adjuvants are normally added during production of the finishing baths, but can, of course, also be added as a component of the polyisocyanates used according to the invention or can be added during production of the fluorinated organic compounds.

The textile substances can be in any desired form, for example, as filaments, fibers, yarns, mats, or woven or knitted fabric.

The fluorinated organic compounds are usually applied so as to deposit 0.5 to 35 g of solid per kg finished textile material. For synthetic fibers with individual titers above 1.2 dtex per filament, the amount applied is preferably 0.5 to 25 g/kg, whereas for synthetic fibers with titers below 1.2 dtex per filament (that is, microfibers) or cellulose fibers or keratin fibers or mixtures thereof, the amount applied is preferably 10 to 35 g/kg.

Application can be by the usual methods used in the textile industry, by slop padding, padding, spraying, foam application, or extraction. These methods are familiar to those skilled in the art and are described in the literature and, therefore, need no special explanation. The dispersion of fluorinated organic compounds is water-based, or alternatively can contain small quantities of organic solvents to improve the stability or for manufacturing reasons.

For cross-linking, the articles must be heated, with the water evaporating before the cross-linking reaction occurs. Usually final curing takes place in the temperature range of 80 to 180° C. (preferably 100° to 150° C.). The products are high-quality water-repellent and oil-repellent finished textile materials having excellent resistance to washing and cleaning, chemical or otherwise, and surprisingly good dirt-resistant properties and considerably improved soil resistance.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all percentages are percentages by weight and relate to the solids in the products being processed.

EXAMPLES

Starting materials

Polyether 1—Monofunctional ethylene oxide/propylene oxide polyether started on butanol, molecular weight 2150, 80% incorporated ethylene oxide units Polyether 2—Monofunctional ethylene oxide polyether started on 3-ethyl-3-hydroxymethyloxetane, molecular weight 1210

Polyether 3—Trifunctional propylene oxide/ethylene oxide polyether started on propylene glycol, molecular weight 2000, 25% incorporated ethylene oxide units Polyether 4—Bifunctional propylene oxide/ethylene oxide polyether started on propylene glycol, molecular weight 4000, 20% incorporated ethylene oxide units Polyether 5—Bifunctional propylene oxide polyether started on propylene glycol, molecular weight 1000

Polyether 6—Polyethylene glycol, molecular weight 3400

Polyether 7—Polyethylene glycol, molecular weight 6000

Polyol 8—Glycerol monostearate

Polyether 9—Bifunctional propylene oxide polyether started on propylene glycol, molecular weight 2000.

Polyether 10: $C_{18}H_{35}$-O-(ethyleneoxide)$_{10}$

Polyether 11: $CH_3$O-(ethyleneoxide)$_{10}$.

All of the polyols used were azeotropically dehydrated

Polyisocyanate 1—Produced by reacting trimethylolpropane with excess toluene diisocyanate (mixture of 2,4- and 2,6-isomers in the ratio of 80:20 by weight), distilling off the excess monomers, and dissolving the product of the reaction in ethyl acetate; NCO content 12.8%, solids content 75%. Polyisocyanate 2—Biuret polyisocyanate based on 1,6-diisocyanatohexane consisting substantially of N,N',N"-tris(6-isocyanatohexyl) biuret and higher homologs thereof, with an NCO content of 21.0%, a content of monomeric 1,6-diisocyanatohexane of less than 0.5%, a viscosity at 28° C. of 8500 mPa.s, and an average NCO functionality of about 3.3 Polyisocyanate 3—Polyisocyanate containing isocyanate groups and prepared by trimerization of some of the isocyanate groups in 1,6-diisocyanatohexane, consisting substantially of tris(6-isocyanatohexyl)isocyanurate and higher homologs thereof with an NCO content of 21.6%, a content of monomeric diisocyanate below 0.3%, a viscosity at 28° C. of 1700 mPa.s, and an average NCO functionality of about 3.3 Sulfonate diol—Propoxylated adduct of butene-2-diol-1,4 and sodium hydrogen sulfite, molecular weight 425, 70% dissolved in toluene

Example 1

211.2 g of polyisocyanate 1 was reacted at room temperature with 64.3 g of polyether 1. Within an hour, 28.3 g of butanone oxime was added dropwise at a room temperature of 22°–40° C. Next, 4.3 mg of p-toluenesulfonic acid methyl ester (dissolved in 10 ml of ethyl acetate) was added at 60° C., together with 9.1 g of sulfonate diol. After agitation for 30 minutes at this temperature, 42.4 g butanone oxime was added dropwise over a period of 60 minutes. After 5 minutes the prepolymer was NCO-negative according to the IR spectrum. Next, a dispersion at 60°–65° C. was continuously formed (in 3–5 minutes) with 760 ml demineralized water. The solvent (toluene/ethyl acetate) was distilled off in vacuo, yielding a finely divided dispersion.

Data:
- Sulfonate: 0.4% (equivalent to 5 meq/100 g of finished product)
- Ethylene oxide: 18.0%
- Solids: 30.0%
- pH: 6–7

Example 2

55.2 g of polyisocyanate 1 was mixed at room temperature with 35.7 g of polyether 1 and 37 ml of ethyl acetate and agitated at 80° C. for 1 hour. After cooling to 60° C., 10 mg of p-toluenesulfonic acid methyl ester and 11.4 g of sulfonate diol were added in succession. After 30 minutes at 60° C., 64.9 g of butanone oxime was added dropwise at 60°–70° C. over a period of about 30 minutes. The mixture was agitated at 70° C. for a further 10 minutes and dispersed in 700 ml of demineralized water. The product, after distilling off the organic solvent, was a finely divided stable dispersion.

Data:
- Sulfonate: 0.5% (equivalent to 6.25 meq/100 g of finished product)
- Solids: 30.0%
- pH: 6–7

Example 3

The procedure was similar to that of Example 2 except for using the following quantities:

| | |
|---|---|
| 261.6 g | polyisocyanate 1 |
| 28.6 g | polyether 1 |
| 9.1 g | sulfonate diol |
| 68.8 g | butanone oxime |
| 10 mg | p-toluenesulfonic acid methyl ester |
| 700 ml | demineralized water |

Data:
- Sulfonate: 0.4% (equivalent to 5 meq/100 g of finished product)
- Ethylene oxide: 9.0%
- Solids: 30.0%
- pH: 6–7

Example 4

129 g of polyisocyanate 2, 20 g of polyether 1, and 6.4 g of sulfonate diol were combined at room temperature and agitated at 95° C. for 1 hour. During the cooling phase, the mixture was catalyzed at 90° C. with one drop of tin(II) octoate. A reaction was brought about at 70° C. with 56.5 g of butanone oxime. After further agitation for 10 minutes, a dispersion was formed in 190 ml of demineralized water and further agitated for 1 hour. The result was a finely divided dispersion.

Data:
- Sulfonate: 0.4% (equivalent to 5 meq/100 g of finished product)
- Ethylene oxide: 8.0%
- Solids: 30.0%
- pH: 6–7

Example 5

78 g of polyisocyanate 3, 35.7 g of polyether 1, and 9.1 g of sulfonate diol were combined at room temperature and agitated at 95° C. for 1 hour. During the cooling phase, the mixture was catalyzed at 90° C. with one drop of tin(II) octoate. A reaction was brought about at 70° C. with 79.2 g of butanone oxime for about 30 minutes. After further agitation for 10 minutes, a dispersion was formed in 700 ml of demineralized water, with further agitation for 1 hour. The result was a stable dispersion.

Data:
- Sulfonate: 0.4% (equivalent to 5 meq/100 g of finished product)
- Ethylene oxide: 10.0%
- Solids: 30.0%
- pH: 6–7

Example 6

253.3 g of polyisocyanate 1 was mixed at room temperature with 39.8 g of polyether 2 and 37 ml of ethyl acetate and agitated at 80° C. for 1 hour. After cooling to 60° C., 10.0 mg of p-toluenesulfonic acid methyl ester and 6.9 g of sulfonate diol were successively added. After 30 minutes at 60° C., 65.4 g of butanone oxime was added dropwise at 60°–70° C. over a period of 30 minutes. After agitation at 70° C. for 10 minutes, a dispersion was formed in 1100 ml of demineralized water. A stable dispersion was obtained after distilling off the organic solvent.

Data:
 Sulfonate: 0.3% (equivalent to 3.75 meq/100 g of finished product)
 Solids: 27.0%
 pH: 6–7

Example 7

41.1 g of polyisocyanate 1 was mixed at room temperature with 53.6 g of polyether 1 and 44 ml of ethyl acetate and agitated at 80° C. for 1 hour. After cooling to 70° C., 4.8 g of dimethylolpropionic acid was added. After 45 minutes at 70° C., 3.44 g of triethylamine was added and 57.4 g of butanone oxime was added dropwise at 70° C. over a period of about 15 minutes. The mixture was further agitated at 70° C. for minutes and dispersed in 700 ml of demineralized water. A stable dispersion was obtained after distilling off the organic solvent.
Data:
 Carboxylate: 0.5% (equivalent to 11.4 meq/100 g of finished product)
 Ethylene oxide: 15.0%
 Solids: 30.0%
 pH: 6–7

Example 8

176.1 g of polyisocyanate 2 was mixed at room temperature with 42.9 g of polyether 1 and 4.8 g of dimethylolpropionic acid and agitated at 80° C. for 1 hour. After cooling to 90° C., one drop of tin(II) octoate was added. After cooling to 65° C., 3.44 g of triethylamine was added and 72.8 g of butanone oxime was added dropwise at 70° C. over a period of about 30 minutes. The mixture was further agitated at 70° C. for 5 minutes and dispersed in 700 ml of demineralized water, resulting in a finely divided stable dispersion.
Data:
 Carboxylate: 0.5% (equivalent to 11.4 meq/100 g of finished product)
 Ethylene oxide: 12.0%
 Solids: 30.0%
 pH: 6–7

Example 9

176 g of polyisocyanate 2 were mixed at room temperature with 43 g of polyether 1 and agitated at 100° C. for 1 hour. After cooling to 70° C., 2.4 g of N-methyldiethanolamine were added and, after 1 hour, 76.1 g of butanone oxime was added dropwise at 70° C. in 30 minutes. The mixture was further agitated at 70° C. for 15 minutes and 20 ml of 1N perchloric acid in 80 g of water was added. After 10 minutes a dispersion was formed in 600 ml of demineralized water, resulting in a finely divided stable dispersion.
Data:
 $N^+$: 9.4 meq/100 g of finished product
 Ethylene oxide: 11.6%
 Solids: 30.0%
 pH: 3.9

Example 10

The procedure was the same as for Example 9 except that 2.3 g (18 mmol) of dimethyl sulfate was added after the reaction with butanone oxime. After a reaction at 65° C. for 1 hour, a dispersion was formed in 700 g of water. The product, when solvent-free, was a finely divided dispersion stable in storage.
Data:
 $N^+$: 8.4 meq/100 g of finished product
 Ethylene oxide: 11.4%
 Solids: 30.0%
 pH: 5.2

Example 11

Example 10 was repeated except for using 2 g of benzyl chloride instead of dimethyl sulfate. The stable end product had a somewhat larger particle size. The data were the same except that the $N^+$ content was 7.3 meq/100 g of finished product.

Comparative Example 1

The same quantities were used as in Example 2 but the following procedure was used:
Polyisocyanate 1 was heated to 50° C. and blocked with butanone oxime over a period of 30 minutes, the temperature rising to 67° C. After cooling to 60° C., polyether 1, p-toluenesulfonic acid methyl ester, and sulfonate diol were successively added. After agitation at 70° C. for 2 hours, no further NCO was detectable in the IR spectrum. A dispersion was then formed in demineralized water. The result, after distilling off the organic solvent, was a coarse suspension that settled immediately and contained pea-sized particles.
Data: (theoretical)
 Sulfonate: 0.5% (equivalent to 6.25 meq/100 g of finished product)
 Methylene oxide: 10.0%
 pH: 6–7 (serum)

The material was completely unsuitable for use according to the invention. Due to its importance, this comparative test was repeated the next day by another person. The result was identically poor. The comparative example clearly shows that only the sequence of process steps according to the invention yields dispersions stable in storage. Comparative Example 2

Example 8 in German Offenlegungsschrift 2,456,469 (believed to correspond to U.S. Pat. No. 4,098,933) was repeated. The result was a finely divided dispersion.
Data:
 Sulfonate: 2.1% (equivalent to 26.3 meq/100 g of finished product)
 Solids: 33.0%
 pH: 7–8

Example 12

300 g (1.57 mol) of polyisocyanate 3 was mixed at room temperature with 200 g (0.09 mol) of polyether 1 and 13.1 g (0.1 mol) of hydroxyethylmorpholine. The mixture was heated with agitation to 105° C. and kept at this temperature for 2 hours. After cooling to 60° C., the NCO content was determined (theoretical 11.3%, found 11.0%) and 10 g of dimethyl sulfate was then added. After 30 minutes at 60° C., 394 g (1.474 mol) of aqueous 39% sodium hydrogen sulfite solution was added. The mixture was further agitated for 10 minutes and then formed into a dispersion with 1315 ml of demineralized water over a period of about 5 minutes. The resultant dispersion was further agitated at 40° C. for 7 hours and then degassed at room temperature. The product was a finely divided dispersion containing 30% solids and 15.6 meq of quaternary nitrogen per 100 g of finished product and having a pH of 5.9.

Example 13

300 g (1.57 mol) of polyisocyanate 3 was treated at room temperature with 200 g (0.09 mol) of polyether 1 and 14.3 g (0.1 mol) of hydroxypropylmorpholine. The mixture was heated with agitation to 105° C. and kept at this temperature for 2 hours. After cooling to 60° C., the NCO content was determined (theoretical 11.1%, found 10.8%) and 10 g dimethyl sulfate was then added. After 30 minutes at 60° C., 397.3 g (1.490 mol) of 39% aqueous sodium hydrogen sulfite solution was added. The mixture was further agitated for 10 minutes and then formed into a dispersion with 1318 of demineralized water over a period of about 5 minutes. The resultant dispersion was further agitated at 40° C. for 7 hours and then degassed at room temperature, resulting in a finely divided dispersion containing 30% solids and 15.55 meq of quaternary nitrogen per 100 g of finished product and having a pH of 5.9.

Example 14

Example 12 was repeated except for using only 6.6 g of hydroxyethylmorpholine and 5 g of dimethyl sulfate. The desired product was obtained after adding 410 g of 39% aqueous sodium bisulfite solution and 1305 g of water. The product now contained 7.9 meq of quaternary nitrogen per 100 g of finished product and had a solids content of 30%.

Example 15

Example 13 was repeated except for using only 7.1 g of hydroxypropylmorpholine and 5 g of dimethyl sulfate. The desired product was obtained after adding 411 g of 39% aqueous sodium bisulfite solution and 1306 g of water. The product now contained 7.9 meq of quaternary nitrogen per 100 g of finished product and had a solids content of 30%.

Example 16

300 g (1.51 mol) of polyisocyanate 3 was treated at room temperature with 150 g (0.07 mol) of polyether 1 and 50 g (0.025 mol) of polyether 9. The mixture was heated with agitation to 105° C. and kept at this temperature for 2 hours. After cooling to 60° C., the NCO content was determined (theoretical 12%, found 11.6%). The resultant prepolymer was mixed at 60° C. with 373.0 g (1.434 mol) of 40% aqueous sodium hydrogen sulfite solution. The mixture was further agitated for 10 minutes and then formed into a dispersion with 1290 ml of demineralized water over a period of about 5 minutes. The resultant dispersion was further agitated at 40° C. for 7 hours and then degassed at room temperature, giving a finely divided dispersion containing 30% solids and having a pH of 6.

Example 17

Example 16 was repeated except for using one drop of dibutyltin dilaurate as catalyst (NCO content: found 11.2%). The result as before was a finely divided stable dispersion containing 30% solids and having a pH of 6.

Examples 18–23

Examples 18–23 were carried out in a manner similar to Example 16 except that polyethers 3–8 (50 g each) were used instead of polyether 9.

| Ex-ample | Poly-ether | % NCO (calc.) | % NCO (found) | pH | Note |
| --- | --- | --- | --- | --- | --- |
| 18 | 3 | 12.0 | 11.7 | 6 | Finely divided, stable |
| 19 | 4 | 12.2 | 12.2 | 6 | Finely divided, stable |
| 20 | 5 | 11.6 | 11.2 | 6 | Finely divided, stable |
| 21 | 6 | 12.2 | 12.1 | 6 | Finely divided, stable |
| 22 | 7 | 12.3 | 11.8 | 6 | Finely divided, stable |
| 23 | 8 | 11.0 | 10.4 | 6 | Finely divided, stable |

Example 24

300 g (1.51 mol) of polyisocyanate 3 was treated at room temperature with 200 g (0.093 mol) of polyether 1. The mixture was heated with agitation to 105° C. and kept at this temperature for 2 hours. After cooling to 60° C., the NCO content was determined (theoretical 12.0%, found 11.9%). The resultant prepolymer was treated at 60° C. with 295.5 g (1.138 mol) of 40% aqueous sodium hydrogen sulfite solution. The mixture was agitated for a further 10 minutes and then dispersed in 1265 ml of demineralized water over a period of about 5 minutes. The resultant dispersion was further agitated at 10° C. for 7 hours and then degassed at room temperature, yielding a finely divided dispersion containing 30% solids and having a pH of 6.

Examples 25–27

Examples 25–27 were carried out according to the procedure of Example 24 except for using different quantities of polyether 1.

| Example | Amount of polyether (g) | % NCO (calc.) | % NCO (found) | pH |
| --- | --- | --- | --- | --- |
| 26 | 100 | 15.3 | 15.1 | 5.7 |
| 26 | 150 | 13.7 | 13.4 | 5.9 |
| 27 | 300 | 9.6 | 9.4 | 6.0 |

Example 28

300 g (1.51 mol) of polyisocyanate 3 was mixed at room temperature with 200 g (0.093 mol) of polyether 1. The mixture was heated to 105° C. with agitation and kept at this temperature for 2 hours. After cooling to 60° C., the NCO content was determined (theoretical 12.0%, found 11.9%). The prepolymer was dispersed with vigorous agitation in a solution of 287.5 g (1.106 mol) of 40% aqueous sodium hydrogen sulfite solution and 1233 ml of demineralized water. After further agitation at 40° C. for 12 hours and subsequent degassing at room temperature, the product was a finely divided low-viscosity dispersion containing 30% solids and having a pH of 5.9.

Example 29

300 g (1.51 mol) of polyisocyanate 2 was mixed at room temperature with 75 g (0.035 mol) of polyether 1 and heated to 100° C. After agitation at this temperature for 1 hour, 45 g (0.5 mol) of glycol monoethyl ether was slowly added dropwise. The mixture was then agitated at 90°–100° C. for 1 hour and the NCO content was determined (calculated 9.8%, found 9.7%). After cooling to 50° C. 520 g (1.0 mol) of 20% aqueous sodium hydrogen sulfite solution was added, followed by agitation at about 40° C. for 1 hour, and dispersion in 807 ml demineralized water. The result, after further agitation at room temperature for 5 hours, was a stable dispersion containing 30% solids and having a pH of 5.3.

Example 30

Example 29 was repeated except for using 300 g (1.51 mol) of polyisocyanate 2, 150 g (0.07 mol) of polyether 1, 21.4 g (0.24 mol) of glycol monoethyl ether, 613.8 g (1.18 mol) of 20% aqueous sodium hydrogen sulfite solution, and 889 ml of demineralized water. The result was a finely divided dispersion containing 30% solids and having a pH of 6.

Example 31

300 g (0.372 mol) of polyether 1 was added with agitation at room temperature to 1200 g (2.380 mol) of polyisocyanate 3 and heated to 100° C. After reacting for 1 hour at 100°–105° C., the NCO content of the resultant prepolymer was determined (theoretical 12.5%, found 12.2%).

Example 32

450 g of the prepolymer of Example 31 was dispersed at 40° C. in 1118 ml of demineralized water continuously and with thorough agitation (over a period of about 2 minutes). After 15 minutes the dispersion was mixed with 293.2 g (1.043 mol) of 37% aqueous sodium hydrogen sulfite solution (that is, 80% of the theoretically required amount). The reaction mixture was further agitated at 40° C. for 20 hours. The result was a finely divided dispersion stable in storage. Data:

Sulfonate groups: 14.9%

Incorporated ethylene oxide groups: 26.5%

Solids: 30% pH: 6.7

Example 33

Example 32 was repeated except for using 450 g of the prepolymer of Example 31, 1084 ml of demineralized water, and 146.6 g (0.522 mol) of 37% aqueous sodium hydrogen sulfite solution (that is, 40% of the theoretically required amount). As in Example 32, a finely-divided dispersion was obtained.

| Sulfonate groups: | 3.2% |
| --- | --- |
| Incorporated ethylene oxide groups: | 29.0% |
| Solids: | 30% |
| pH: | 7.7 |

Examples 34–36

Examples 34–36 were carried out according to the procedure of Example 32 except for using different amounts of 40% aqueous sodium hydrogen sulfite solution.

| Example | NaHSO₃ (%) | Sulfonate (%) | EOx[1] (%) | Solids (%) | pH | Note |
| --- | --- | --- | --- | --- | --- | --- |
| 34 | 60 | 11.6 | 27.4 | 30 | 6 | Low particle size/stable |
| 35 | 20 | 4.4 | 30.8 | 30 | 6 | Low particle size/stable |
| 36 | 100 | 17.4 | 26.1 | 30 | 6 | Low particle size/stable |

[1]EOx represents incorporated ethylene oxide content.

Example 37

300 g (1.57 mol) of polyisocyanate 3 were mixed at room temperature with 200 g (0.09 mol) of polyether 1 and 11.6 g (0.1 mol) of N-methyldiethanolamine. This mixture was heated with agitation to 105° C. and kept at this temperature for 2 hours. After cooling to 60° C., the NCO content was determined (theoretical 10.6%, found 10.5%). After 30 minutes at 60° C., 397 g (1.488 mol) of aqueous 39% sodium hydrogen sulfite solution were added. The mixture was further agitated for 10 minutes and then formed into a dispersion with 1207 ml of a demineralized water over a period of about 5 minutes. The resultant dispersion was further agitated at 40° C. for 7 hours and then 166 g of an aqueous solution of p-toluene-sulfonic acid were added followed by degassing at room temperature. The product was a finely divided dispersion containing 30% solids and 15.6 meq of quaternary nitrogen per 100 g of finished product, having a pH of 5.5.

Example 38

150 g (0.757 mol) of polyisocyanate 3 were mixed at room temperature with 75 g (0.15 mol) of polyether 11 and 0.7 g benzoyl chloride. The mixture was heated with agitation to 80° C. and kept at this temperature for 1 hour. After cooling to 45° C., the NCO content was determined (theoretical 11.7%, found 11.1%). After 30 minutes at 45° C., 174.1 g (0.653 mol) of aqueous 39% sodium hydrogen sulfite solution were added. The mixture was further agitated for 10 minutes and then formed into a dispersion with 577 ml of demineralized water over a period of about 5 minutes. The result was immediately a blush dispersion and was further agitated at 40° C. for 12 hours. The product was a finely divided dispersion containing 30% solids, having a pH of 5.5.

Comparative Example 150 g (0.75 mol) of polyisocyanate 3 were mixed at room temperature with 75 g (0.12 mol) of polyether 10 and 0.7 g benzoyl chloride. The mixture was heated with agitation to 80° C. and kept at this temperature for 1 hour. After cooling to 45° C., the NCO content was determined (theoretical 12.1%, found 12.1%). After 30 minutes at 45° C., 190.6 g (0.715 mol) of aqueous 39% sodium hydrogen sulfite solution were added. The mixture was further agitated for 30 minutes and then dispersed with 582 ml of demineralized water over a period of about 5 minutes. The resultant dispersion exhibited two phases. Further agitation at 40° C. for 12 hours did not improve the material. Immediately after stopping the stirrer sedimentation occurred. The upper phase had a solid content of 9% (clear solution) and a pH of 5. The lower phase had a solid content of 52% and was a gritty paste.

Since no stable dispersion could be obtained, the material could not be tested.

Application

Application Example 1 (Washing fastness)

Linen weave fabric made of PES/CO mixed yarn (67/33) weighing about 160 g/m² was impregnated with the following liquors, squeezed in the padding mangle to an approximately 70% liquor pick-up, dried at 80° C., and baked at 150° C. for 5 minutes.

The following impregnation liquors were used:

1.1 (known)

- 50 g/l 40% aqueous dimethylol ethylene urea solution (DMEU)
- 60 g/l a dispersion of an acrylate copolymer containing perfluoroalkyl chains and having about 40% fluorine (relative to solids) and about 12% solids (relative to the total dispersion) (BAYGARD ® AFE, available from Bayer AG, Germany)
- 3 g/l zinc nitrate catalyst for the dimethylol ethylene urea (DMEU)

1.2 (according to the invention)

- 50 g/l 40% aqueous dimethylol ethylene urea solution (DMEU)
- 60 g/l a dispersion of an acrylate copolymer containing perfluoroalkyl chains and having about 40% fluorine (relative to solids) and about 12% solids (relative to the total dispersion) (BAYGARD ® AFE, Bayer AG, Germany)
- 3 g/l zinc nitrate catalyst for the dimethylol ethylene urea (DMEU)
- 15 g/l the dispersion described in Example 2

1.3 (comparison)

- 50 g/l 40% aqueous dimethyol ethylene urea solution (DMEU)
- 60 g/l a dispersion of an acrylate copolymer containing perfluoroalkyl chains and having a fluorine content of about 40% (relative to solids) and about 12% solids (relative to the total dispersion) (BAYGARD ® AFE, Bayer AG, Germany)
- 3 g/l zinc nitrate catalyst for the dimethylol ethylene urea (DMEU)
- 15 g/l the dispersion described in Comparative Example 2.

A. Rain test according to Bundesmann DIN 53888
B. Oil repellency test according to AATCC 118-1978
C. Spray test according to AATCC 22-1974.
The test results were as follows:

|  | | Finish | |
| --- | --- | --- | --- |
| Test | 1.1 | 1.2 | 1.3 |
| A. Repellency time (min) | 10 | 10 | 5 |
| Repellency effect (Marks 5–1) | 5 | 5 | 2 |
| Water uptake | 2.5 | 2.5 | 18.5 |
| B. Oil repellency (Marks 8–1) | 5 | 5 | 5 |
| C. Spray test (Marks 100–0) | 100 | 100 | 100 |

The fabrics finished in this way were then washed five times at 40° C. in a domestic washing machine using a domestic detergent and dried at room temperature after each washing cycle. The washed fabrics were then tested in the oil repellency test B and the spray test C described above.

|  | | Finish | |
| --- | --- | --- | --- |
| Test | 1.1 | 1.2 | 1.3 |
| B. Oil repellency (Marks 8–1) | 3 | 4 | 2 |
| C. Spray test (Marks 100–0) | 50 | 100 | 0 |

Application Example 2 (Washing fastness/synthetic fibers)

Twill-weave fabric made of 100% PES filament yarns, the individual titer of the filaments being about 4 dtex and weighing 190 g/m², was impregnated with the following liquors, squeezed to a liquor pick-up of about 58%, dried at 100° C., and baked at 180° C. for 60 seconds.

The following impregnating liquors were used:

2.1 (according to the invention)

- 20 g/l isopropanol
- 1 g/l 60% acetic acid
- 80 g/l a dispersion of an acrylate copolymer containing perfluoroalkyl chains and having about 40% fluorine (relative to solids) and about 16% solids (relative to the total dispersion) (BAYGARD ® CA 40135, Bayer AG, Germany)
- 15 g/l the dispersion described in Example 2

2.2 (comparison)

- 20 g/l isopropanol
- 1 g/l 60% acetic acid
- 80 g/l a dispersion of an acrylate copolymer containing perfluoroalkyl chains and having about 40% fluorine (relative to solids) and about 16% solids (relative to the total dispersion) (BAYGARD ® CA 40135, Bayer AG, Germany)
- 10 g/l an aqueous cationically modified polyurethane dispersion according to Example 1 of German Offenlegungsschrift 3,523,856 (believed to correspond to U.S. Pat. No. 4,670,100)
- 3 g/l a 50% aqueous solution of a melamine/formaldehyde condensate
- 1 g/l zinc nitrate catalyst for the melamine/formaldehyde condensate

2.3 (known)

- 20 g/l isopropanol
- 1 g/l 60% acetic acid
- 80 g/l a dispersion of an acrylate copolymer containing perfluoroalkyl chains and having a fluorine content of about 40% (relative to solids) and about 16% solids (relative to the total dispersion) (BAYGARD ® CA 40135, Bayer AG, Germany)
- 3 g/l a 50% aqueous solution of a melamine/formaldehyde condensate
- 1 g/l zinc nitrate catalyst for the melamine/formaldehyde condensate In the original state, the fabric had good water and oil-repellency, with the different finishings. No differences were found in the water and oil repellency, tested by the abovementioned methods (spray test mark 100 and oil test mark 5–6). The fabric was then washed in a domestic washing machine using a domestic detergent at 40° C. and mechanically dried in a tumbler at about 70° C. after each washing cycle.

The fabric treated with liquor 2.1 had a spray test mark of 100 and an oil mark of 4 after 20 washing cycles, whereas the values for the fabric treated with liquor 2.2 were 90 in the spray test and 2 in the oil test after only 13 washing cycles. The fabric finished with liquor 2.3 (without an additive to improve wash-fastness) was only 80 in the spray test and 2 in the oil test after only 8 washing cycles.

Application Example 3 (washing-fastness)

Linen weave fabric made of PES/CO mixed yarn (67/33) and weighing about 160 g/m² was impregnated with the following liquors, squeezed to a liquor pick-up of 70% in a padding machine, dried at 1100° C., and then condensed at 150° C. for 5 minutes.

The following impregnating liquors were used:

---

3.1 (comparison)

40 g/l 40% aqueous dimethylol ethylene urea solution (DMEU)
50 g/l a dispersion of an acrylate copolymer containing
 perfluoroalkyl chains and having about 40% fluorine
 (relative to solids) and about 20% solids (relative
 to the total dispersion); the copolymer contained no
 reactive OH or OR groups
3 g/l zinc nitrate catalyst for the dimethylol ethylene
 urea (DMEU)

3.2 (according to the invention)

40 g/l 40% aqueous dimethylol ethylene urea solution (DMEU)
50 g/l a dispersion of an acrylate copolymer containing
 perfluoroalkyl chains and having a fluorine content
 of about 40% (relative to solids) and about 20%
 solids (relative to the total dispersion); the
 copolymer contained no reactive OH or OR groups
15 g/l the dispersion described in Example 2
3 g/l zinc nitrate catalyst for the dimethylol ethylene
 urea (DMEU)

---

The treated fabric was evaluated in its original state and after repeated washing. In order to evaluate the multiple washes, the fabrics were washed at 40° C. in a domestic machine using a domestic detergent and dried at about 70° C. after each washing cycle. The Values are shown in the following table.

| Fabric | Evaluation method | Original treatment | After Washes 3× | 5× | 10× |
|---|---|---|---|---|---|
| Liquor 3.1 | A. Repellency time (min) | 10 | 0 | 0 | 0 |
|  | Repellency effect (Marks 5–1) | 5 | 1 | 1 | 1 |
|  | Water uptake (%) | 2.1 | 28 | 28 | 29 |
|  | B. Oil repellency (Marks 8–1) | 5 | 3 | 3 | 2 |
| Liquor 3.2 | A. Repellency time (min) | 10 | 10 | 10 | 10 |
|  | Repellency effect (Marks 5–1) | 5 | 5 | 5 | 5 |
|  | Water uptake | 2.9 | 2.9 | 5.4 | 9.3 |
|  | B. Oil repellency (Marks 8–1) | 5 | 6 | 5 | 4 |

Application Example 4 (soil redeposition)

Bleached and optically whitened PES/CO twill (60/40) weighing about 240 g/m² was impregnated with the following liquors, squeezed to a liquor pick-up of 60% in the padding mangle, dried at 110° C., and then baked at 50° C. for 5 minutes.

The finish suitable for easier soil release was tested as follows. A 20×20 cm test-specimen was spotted with 5 ml of a lanolin/carbon black mixture and loaded with 2.5 kg for 1 minute under a glass plate. After an hour, the non-absorbed part was removed with a paper towel. After 24 hours, the test-specimen was washed at 60° C. with a domestic detergent containing perborate. The spot that remained was visually evaluated based on the DIN 54002 grey scale for stains. The lanolin/carbon black mixture consisted of 50 g lanolin DAB 6, 10 g color carbon black FW 1 (available from Degussa), 0.2 g oil-soluble red dye Ceresred 4 B, and 500 ml perchloroethylene.

The soil redeposition was tested as follows. 0.5 g carbon black CK 3 (available from Degussa) was mixed with 2.0 g DIXAN® laundry detergent (available from Henkel) and formed into a slurry with hot water. The mixture was left for 4–5 hours, then made up to 1 liter with water, agitated in a highspeed agitator for 5 minutes, and heated to 60° C. The testpiece was placed in the dirty bath and stirred therein at constant temperature for 15 minutes (liquor ratio 1:50). The testpiece was then rinsed in running cold water for 5 minutes and dried. The soil redeposition was evaluated on the basis of the DIN 54002 grey scale for stains.

The following impregnating liquors were used:

---

4.1 (according to the invention)

60 g/l 40% aqueous dimethylol ethylene urea solution (DMEU)
60 g/l a dispersion of an acrylate copolymer containing
 perfluoroalkyl chains and having a fluorine content
 of about 60% (relative to solids) and about 30%
 solids (relative to the total dispersion); the
 copolymer contained polyethylene oxide methacrylate
 having reactive OH groups as described in Example 3
 of European Patent Application 312,964 (believed to
 correspond to U.S. Pat. No. 4,859,754)
15 g/l the dispersion described in Example 2
6 g/l zinc nitrate catalyst for the dimethylol ethylene
 urea (DMEU)

4.2 (known)

60 g/l 40 aqueous dimethylol ethylene urea solution (DMEU)
60 g/l a dispersion of an acrylate copolymer containing
 perfluoroalkyl chains and having a fluorine content
 of about 60% (relative to solids) and about 30%
 solids (relative to the total dispersion); the
 copolymer contained polyethylene oxide methacrylate
 with reactive OH groups as described in Example 3 of
 European Patent Application 312,964 (believed to
 correspond to U.S. Pat. No. 4,859,754)
6 g/l zinc nitrate catalyst for the dimethylol ethylene
 urea (DMEU)

---

The fabric finished with liquor 4.1 and washed once had a mark of 4–5 in the soil redeposition test. By contrast, the mark for the fabric finished with liquor 4.2 was 3. A mark 5 denotes imperceptible soiling, whereas mark 1 denotes pronounced greying caused by dirt.

Application Example 5 (dry soiling on carpet)

A polyamide-6.6 tufted carpet weighing about 600 g/m² and having a polypropylene base was sprayed with a solution according to German Offenlegungsschrift 3,307,420 (believed to correspond to U.S. Pat. No. 4,781,844) having the following composition:

---

110 g/l a 6% aqueous alcoholic solution of a methyl sil
 sesquioxane
150 g/l a dispersion of an acrylate copolymer containing
 perfluoroalkyl chains and having a fluorine content
 of about 40% (relative to the solids) and about 16%
 solids (relative to the total dispersion) (BAYGARD ®
 CA 40135, Bayer AG, Germany)
10 g/l the dispersion described in Example 2

---

A 20×30 cm piece of the carpet was uniformly sprayed with 15 ml of the mixture using a spray gun and was then dried at 80° C. and heat-treated at 130° C. for 4 minutes. The dry soiling was evaluated by a drum soil test. The carpet material finished in this way suffered much less dry soiling than a comparison sample that had been finished with the same amount of a mixture not containing the dispersion described in Example 2.

Application Example 6 (Crease resist finish)

A bleached linen weave cotton fabric weighing about 250 g/m² was impregnated with the following liquors, squeezed to a residual moisture content of 80%, dried at 110° C., and condensed at 150° C. for 5 minutes.

| 6.1 | (according to the invention) |
|---|---|
| 130 g/l | the 25% aqueous dispersion of a blocked polyurethane described in Example 28 |
| 1 g/l | NaHCO$_3$ |
| 6.2 | (known) |
| 80 g/l | approximately 40% dimethylol ethylene urea solution (DMEU) |
| 13 g/l | MgCl$_2$ catalyst for the DMEU |

The individual properties were evaluated by conventional methods known in the industry.

| | Finishes | | |
|---|---|---|---|
| | Liquor 6.1 | Liquor 6.2 | Without finish |
| Dry crease recovery angle (warp + weft) | 130 | 137 | 80 |
| Wet crease recovery angle (warp + weft) | 210 | 205 | 170 |
| Dry tearing strength (N) (warp) | 926 | 770 | 930 |
| Whiteness (according to Berger) | 47.5 | 47 | 49 |
| Free formaldehyde (ppm) (according to AATCC) | 20 | 260 | 20 |

What is claimed is:

1. A water-repellent/oil-repellent agent for finishing textiles comprising
    (I) a blocked polyisocyanate having an NCO functionality of from 2.2 to 4.5 and an average molecular weight of 800 to 5000 and containing
        (1) blocked isocyanate groups corresponding to an NCO content of 5 to 20 wt. %, calculated as free NCO, relative to unblocked polyisocyanate,
        (2) 1 to 75 milliequivalents of ionic groups per 100 g of blocked polyisocyanate, and
        (3) to 40 wt. % of polyalkylene oxide units relative to the blocked polyisocyanate,
    wherein said blocked polyisocyanate is prepared by a process comprising reacting
        (a) an organic polyisocyanate,
        (b) an NCO-reactive compound containing ionic or potentially ionic groups,
        (c) a polyalkylene ether,
        (d) an NCO-blocking agent other than an alkali metal bisulfite, and
        (e) optionally, other NCO-reactive compounds different from components (b), (c), and (d),
    wherein said process is carried out by reacting components (a), (b), (c) and, optionally, (e) to form an unblocked polyisocyanate containing incorporated polyalkylene oxide units and ionic groups and then reacting said unblocked polyisocyanate with NCO-blocking agent (d) to form the blocked polyisocyanate, and
    (II) one or more fluorinated organic compounds.

2. A water-repellent/oil-repellent agent according to claim 1 wherein the blocked polyisocyanate contains blocked isocyanate groups corresponding to an NCO content of 10 to 20 wt. %, calculated as free NCO.

3. A water-repellent/oil-repellent agent according to claim 1 wherein the blocked polyisocyanate contains 2 to 25 milliequivalents of ionic groups per 100 g of blocked polyisocyanate.

4. A water-repellent/oil-repellent agent according to claim 1 wherein the blocked polyisocyanate contains polyalkylene oxide units containing 50 to 100 wt. % ethylene oxide units.

5. A water-repellent/oil-repellent agent according to claim 4 wherein the polyalkylene oxide units contain propylene oxide units in addition to ethylene oxide units.

6. A water-repellent/oil-repellent agent for finishing textiles according to claim 1 wherein the fluorinated organic compound has a fluorine content of 0.2 to 65 wt. %, contains perfluoro-$C_3$–$C_{20}$-alkyl groups containing up to one hydrogen or chlorine atom for each two carbon atoms and contains no hydroxyl groups.

* * * * *